United States Patent [19]

Tavel et al.

[11] Patent Number: 4,660,758
[45] Date of Patent: Apr. 28, 1987

[54] WASTE SEPARATOR-RECEPTACLE FOR RECYCLING OF MATERIALS WITH ENVIRONMENTAL CONTROL DISPENSER AND HOLDER

[76] Inventors: Goldie K. Tavel, 250 South Ocean Blvd., Boca Raton, Fla. 33432; J. Henry Schildmeier, 6030 Crows Nest Dr., Indianapolis, Ind. 46208

[21] Appl. No.: 744,954

[22] Filed: Jun. 17, 1985

[51] Int. Cl.⁴ .............................................. A47G 29/00
[52] U.S. Cl. .................................... 232/43.2; 312/211
[58] Field of Search ...................... 232/1 B, 1 E, 43.1, 232/43.2; 220/1 T, 22; 312/211, 212

[56] References Cited

U.S. PATENT DOCUMENTS

| | | | |
|---|---|---|---|
| 1,281,587 | 10/1918 | Kovachevich | 232/43.2 X |
| 2,531,444 | 11/1950 | Lane | 312/211 |
| 3,636,862 | 1/1972 | Bottas et al. | 312/211 X |
| 3,788,719 | 1/1974 | Whited | 312/212 X |
| 3,817,448 | 6/1974 | Schneider | 232/43.2 |

FOREIGN PATENT DOCUMENTS

| | | | |
|---|---|---|---|
| 2733437 | 2/1979 | Fed. Rep. of Germany | 312/211 |
| 1203943 | 1/1960 | France | 232/43.1 |

*Primary Examiner*—Robert P. Swiatek
*Attorney, Agent, or Firm*—Harry W. Barron

[57] ABSTRACT

A separator-receptacle for holding waste products. A main body includes at least four separate cavities opening outwardly each closed by a door to facilitate the separation and holding of paper, metal, glass and miscellaneous waste products. The paper door includes a slot through which the paper waste products are inserted. A plurality of containers are positioned within the separator receptacle adjacent each door to receive the particular waste product. Baskets are provided for holding the containers. Indicia are provided for coordinating the particular type of waste product associated with each container and door. Dispensers are mounted within the separator-receptacle for automatically decontaminating and deodorizing the materials placed therein.

7 Claims, 3 Drawing Figures ature, and

WASTE SEPARATOR-RECEPTACLE FOR RECYCLING OF MATERIALS WITH ENVIRONMENTAL CONTROL DISPENSER AND HOLDER

BACKGROUND OF THE INVENTION

1. Field of the Invention

This invention is a waste Separator-Receptacle designed for the temporary storage of recyclable products, which is used to facilitate and in connection with a governmental, public and/or private program for the recycling of materials.

2. Description of the Prior Art

There are waste containers that are round, square and rectangular in existence, but nothing of the nature and use described or contemplated herein by this invention is known to exist. A number of U.S. patents have been granted on a variety of receptacles or containers having various compartments for receiving different types of waste materials. For example U.S. Pat. Nos. 1,021,872 and 3,720,346 issued, respectively, to W. M. Kingsbury and David T. Cypher, both disclose a compartmented trash receptacle for segregating different types of trash. The first aforementioned patent discloses a two-compartment receptacle for receving garbage in one compartment and paper in the second compartment, whereas the second aforementioned patent disclosed a cylindrically, upwardly opening receptacle having at least four cavities for receiving different types of trash. Another design is shown in the U.S. Pat. No. 1,327,778 issued to H. Reichman and A. R. Spangenberg having multiple compartments for receiving trash and packages. Sliding doors are provided for closing the trash receiving compartment.

Additional prior art containers include the multiple compartment refuse container shown in U.S. Pat. No. 3,893,615 issued to William R. Johnson wherein a plurality of compartments are provided, each closed by a pivoting door with each compartment having a removable trash bag received therein for receiving the refuse. The trash bag is secured in place by means of a lip extending around the compartment opening. A more simplified approach is shown in U.S. Pat. No. 3,856,173 issued to Loryn B. Deane and Edward V. Deane which discloses a plurality of trash receptacles designed for use in the home for the separation of trash such as glass, cans, papers and the like. Despite all of these prior receptacles for separating trash, there still has not been adopted a uniform procedure for the masses which will provide for the automatic separation of trash at its source and the subsequent collection thereof. In addition, previous inventions do not emphasize the problems of odor, germs and mold connected with the use of the invention.

As discussed at page 4 following concerning the Sierra magazine article, cities are burning their waste materials and garbage as space for landfills becomes scarce and most landfills do leak into the environment. Combustion of products, when burned, causes a significant amount of air pollution amounts of chemicals to be injected into the atmosphere both on land and into the air. As a result, a national recycling program is needed to separate the various products, particularly glass, papers and metals into definable groups of trash. Various devices have been provided for processing trash to separate the materials into different groups. For example, in U.S. Pat. No. 1,987,640 issued to A. E. Rothgarn, there is shown a device for separating materials of different specific gravity. Likewise, in U.S. Pat. No. 3,232,220 issued to A. A. Sileski, there is shown a machine that is used for compacting and disposing of three basic types of rubbish. Another approach is shown in the U.S. Pat. No. 4,114,776 issued to Ernest Pluss wherein a relatively large container is disclosed having multiple compartments for collecting products to be recycled. The large receptacles and machines are typically designed for commercial application and thus, are ineffective for use by homeowners. Disclosed herein is a new waste separator receptacle which may be used at home, at work or elsewhere for the segregation of trash into at least four or more, or for example in this application five different categories.

The product disclosed herein may be mass produced and marketed to provide easy recycling of certain waste materials found in all modern societies including both hazardous and non-hazardous trash. The Separator-Receptacle specifically reduces the need for importation of certain raw materials from abroad, such as bauxite for aluminum, which ultimately generates more trash in a never-ending cycle. This new trash generated has to be either burned or buried in a landfill or other depository. The importation of raw materials exacerbates the problem and the balance of payments deficits of modern nations is made worse. Recycling definitely diminishes such deficits and reduces trash at the source.

The subject invention is what I call an EcoBasket, as its very name implies it encourages recycling and seeks to diminish the need now and in the future for governments to buy highly sophisticated air and water pollution equipment to reduce trash, which systems either burn the trash or store wastes but, in turn, give off enormously harmful air emissions or allow leaking into water systems of hazardous substances.

Even more startling is what the invention seeks to prevent as a consequence of the burning or landfilling and storage of waste materials. The article "Toxics and Male Infertility" by Michael Castleman, *Sierra Magazine,* March/April, 1985, described how chemicals as poisonous dioxin emissions and leaks of hazardous substances into ground water are entering the human body and causing male infertility and damage to other living things. The need for this invention disclosed herein is urgent and now.

As is commonly known today, it is absolutely imperative that organized recycling of materials expand on a grand scale for the future existence of the work based upon finite resources.

SUMMARY OF THE INVENTION

Figure 1:
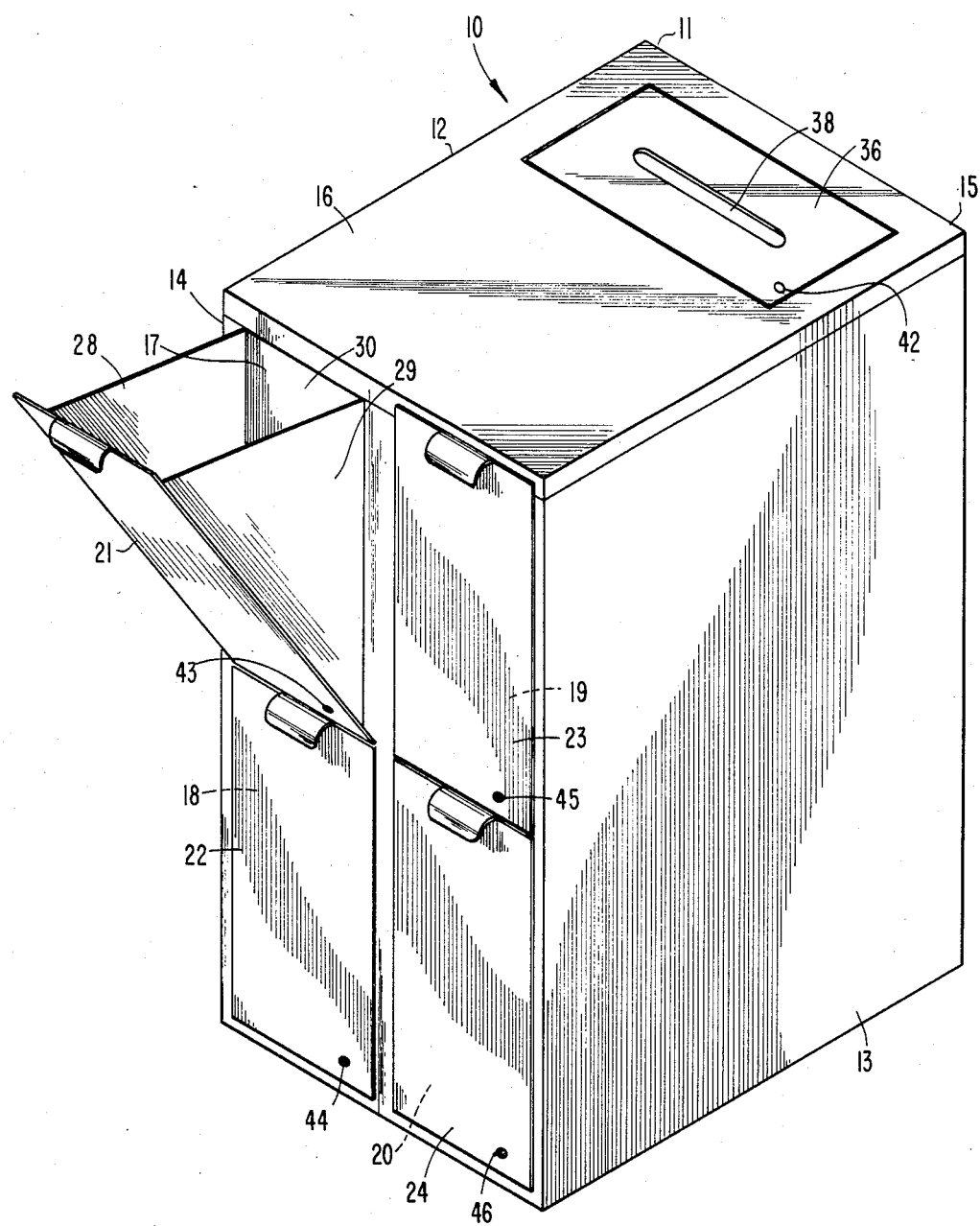
FIG. 1 is a perspective view of the preferred embodiment of the waste separator-receptacle incorporating the present invention.

One embodiment of the invention is a waste separator-receptacle for recycling of materials comprising a frame having four or more internal waste receiving cavities each opening outwardly thereof, first closure means on the frame at least partially enclosing one of the cavities, second closure means on the frame at least partially enclosing one of the cavities, third closure means on the frame at least partially enclosing one of the cavities, and fourth closure means on the frame at least partially enclosing one of the cavities, at least four separate disposable means removably mountable each within a separate cavity and being visually distinguishable apart to separately hold paper, metal, glass and miscellaneous waste products and being operable to individually hold the waste products within the cavities for eventual removal and discarding, holding means on the frame to removably hold the separate disposable means, and, coordinating means associated within the disposable means and the first closure means, the second closure means, the third closure means and the fourth closure means operable to predetermine the particular waste product to be inserted into a cavity associated with a particular closure means and disposable means and a top drop-in enclosure with lid for disposable materials.

It is an object of the present invention to provide a new and improved waste separator-receptacle for recycling of materials.

Related objects and advantages of the present invention will be apparent from the following description.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawing, there is shown the waste separator-receptacle 10 for separating trash into four or more separate categories as for example depicted on the drawings herein. The separator-receptacle includes a six-sided main body 11 produced from plastic, metal, or other suitable material. The two sidewalls 12 and 13 are integrally joined to the front wall 14 and back wall 15 with a top wall 16 and bottom wall 60 extending thereacross. Four separate openings 17, 18, 19 and 20 are provided in front wall 14 which are respectively closed by four doors 21, 22, 23 and 24.

Figure 2:
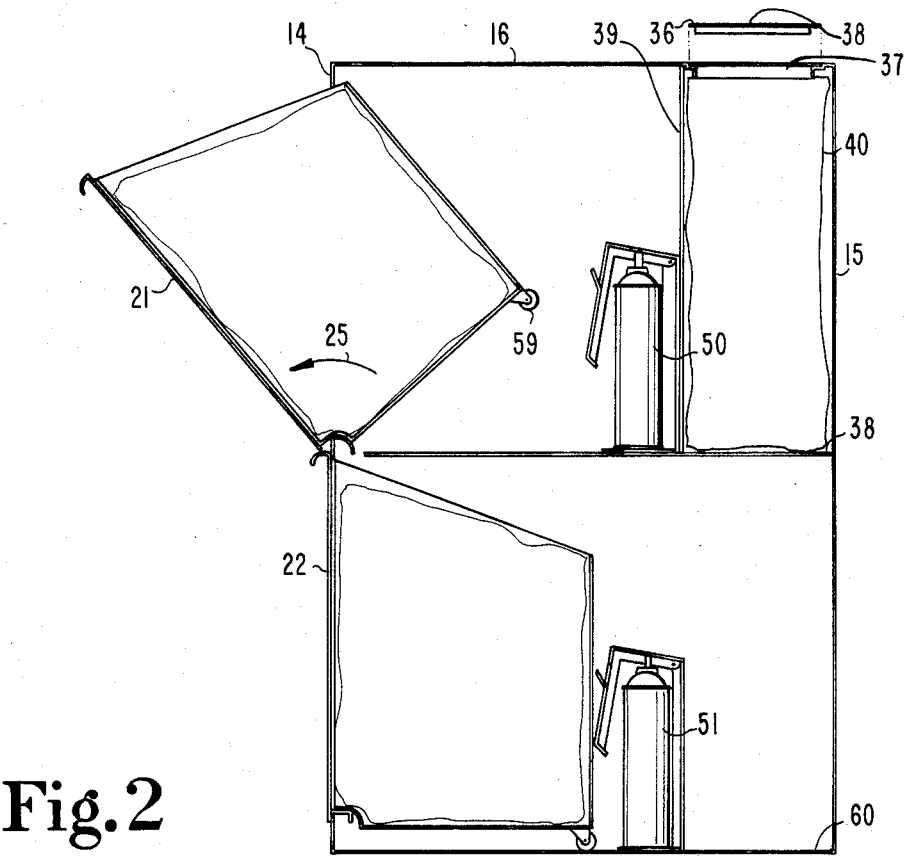
FIG. 2 is a cross-sectional view of the separator-receptacle of FIG. 1.

Each door includes a handle affixedly mounted thereon to allow the door to be grasped and pivoted open in the direction of arrow 25 (FIG. 2). The bottom of each door is pivotally mounted to the front wall 14 by a suitable hinge or slip pivot joint. In the embodiment shown in FIG. 2, the bottom portion of each door is integrally attached to the front wall 14 by means of a groove or hinge provided in the bottom wall of the drawer which in turn fittingly and pivotally receives a ridge formed on the bottom edge of front wall 14 located at the bottom of the drawer opening.

Drawer 21 will now be described, it being understood that a similar description applies to the other three drawers. Drawer 21 includes a bottom wall 27 joined to the drawer side walls 28 and 29 along with the drawer back wall 30 and drawer front wall 31 with groove 26 formed in bottom wall 27. Groove 26 has a radius or curvature not greater than the radius or curvature of ridge 32 formed on wall 14 and extending along the bottom of opening 17. The top edge portion 33 of front wall 31 fits against the front wall 14 when the drawer is in the closed position.

Doors 21 through 24 may have suitable indicia thereon to indicate the type of trash to be inserted through the respective openings. A fifth door 36 is loose, as shown in FIG. 2, or is hingedly mounted to the top wall 16 and may be pivoted to open and close opening 37. Door 36 may be constructed similar to doors 21 through 24 in that it may by hingedly mounted by means of a living hinge or slip pivot joint including the groove and ridge combination and further may include a handle or finger holes to allow the door to be grasped and pivoted opened or removed. Unlike doors 21 through 24, door 36 has a slot or opening 38 extending therethrough to allow paper and paper board products to be inserted through the slot and thus into the receptacle therebeneath. Thus, door 36 is opened only when objects larger than the slot are to be inserted into the receptacle or when the receptacle is to be emptied.

Figure 3:
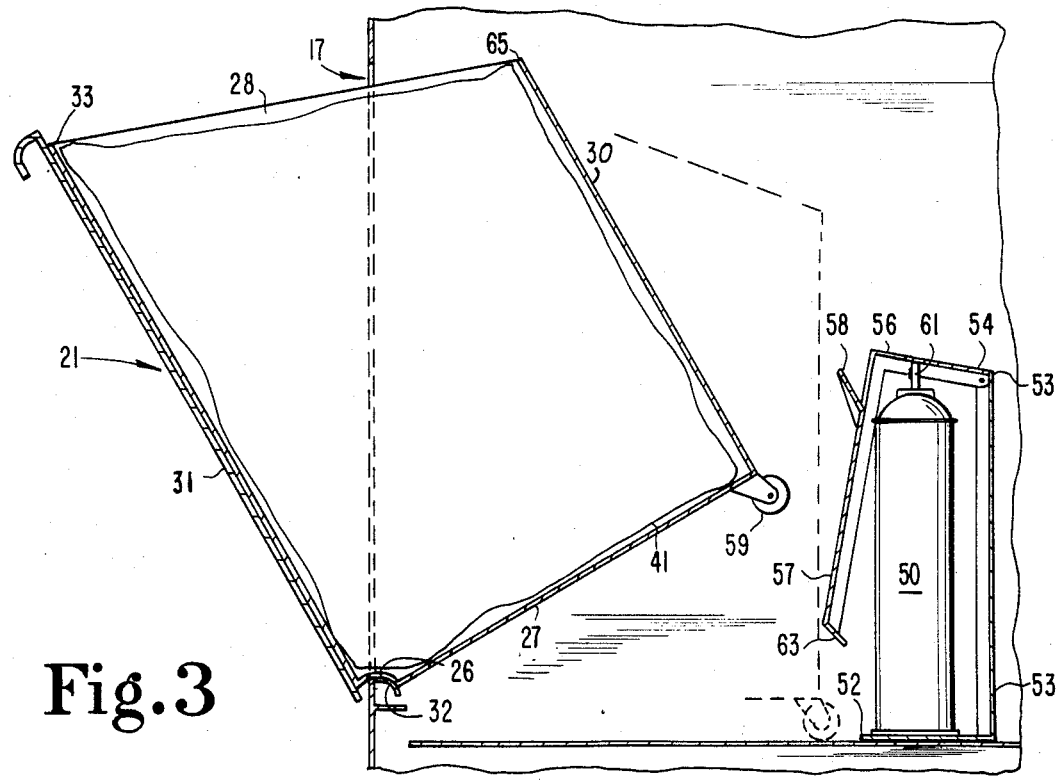
FIG. 3 is an enlarged side view of one of the drawers in the open position along with an environment control dispenser with holder

Each opening 17, 18, 19, 20 and 37 includes a basket therein with a disposable bag, sack, or other suitable container positioned therein to receive and hold the refuse inserted through the opening. Each basket includes an interior bottom wall attached to each drawer front wall for drawers 21 through 24 such as bottom wall 27 for drawer front wall 31 (FIG. 3). Bottom wall 38 is joined and extends between the side walls 12 and 13 along with interior wall 39 and back wall 15 with wall 38 positioned beneath opening 37 and door 36. Walls 38 and 39, in conjunction with the side walls, back wall, and top wall, form the basket or cavity to hold the disposable container 40 to receive the paper trash products inserted through slot 38. Additional containers are removably held within each drawer. Four such bags, sacks, or containers are provided immediately behind each door 21 through 24. One such bag 41 is shown positioned behind door 21 and is identical to the bags positioned behind doors 22, 23 and 24.

Many variations are contemplated and included in the present invention. For example, the main body of the separator-receptacle shown in the drawings, as well as all of the interior walls and doors are of a one piece or integral plastic material. Additional variations include producing the main body from metal. Further, the bags, sacks or containers removable from the separator-receptacle may be produced from a variety of materials. All extra bags or sacks may be produced from a biodegradable material except for the bag immediately behind the miscellaneous trash compartment door 22 and 24. It is important that four or more separate cavities be provided which open outwardly such as shown by openings 17 through 20. Four such openings are required to facilitate the separation of trash into at least four categories namely, paper, metal, glass and miscellaneous. It is also desirable that the bags placed within the cavities be distinguishable once they are removed therefrom. Such distinguishment may be provided by coloring the bags. For example, container 40 may be of a color white, container 41 of a black color and containers immediately adjacent doors 22 through 24 being, respectively, green, red and yellow. In such a manner, once the containers are removed from the separator-receptacle and deposited at the ultimate trash disposal site, it will be readily determined the type of trash within each container without the necessity of opening each container. By placing a corresponding color on each 36, 21 through 24, the user will be able to remember the particular color of bag to be inserted into the respective cavity. For example, five small dots of the colors white, black, green, red and yellow, respectively, 42, 43, 44, 45 and 46, may be placed on the outward surface of doors 36, 21, 22, 23 and 24, indicating the particular color of bag to be inserted into the cavities. Of course, the particular colors enunciated herein may be changed depending upon the overall color scheme adapted by the particular community.

In addition to the separate compartments, the enclosure 11 or main body of the Receptacle-Separator includes one or more environment control fluid or mist dispensers and associated holders to dispense a germicide, disinfectant, insecticide, odorizer or de-odorizer. In the embodiment shown in FIG. 2 there are two such dispensers 50 and 51 shown mounted adjacent drawers 21 and 22 although it is understood that additional dispensers may be mounted adjacent the remaining compartments.

Dispenser 50 and associated holder will now be described it being understood that a similar description applies to dispenser 51 and associated holder. Dispenser 50 is of commercial design and includes a basic can with an aerosol jet 61 mounted thereatop. The can is pressurized with the particular liquid/mist to be dispensed whenever the jet 61 is depressed. Commercially available pressurized cans having germicide, insecticide, odorizer or de-odorizer therein are available. Holder 53 is mounted to the front surface of wall 39 and includes a bottom wall 52 for holding the dispenser can. A top wall 54 is hingedly and pivotally mounted by a conventional hinge with top wall 54 extending over the dispenser jet and resting thereatop. A front wall 57 is attached to top wall 54 and extends downwardly immediately adjacent the rear wall 30 of drawer 21. A plastic roller 59 is rotatably mounted to the bottom corner of walls 27 and 30 and contacts the inwardly turned bottom edge 63 of wall 57 as the drawer is pivoted outwardly in the direction of arrow 25. The edge of wall 30 is sized to contact the top edge of front wall 14 surrounding the drawer opening to limit the outward movement of the drawer. For, example edge 65 contacts wall 14 (FIG. 3) when the drawer is in the open position. Contact between roller 59 and edge 63 results in the counter-clockwise movement, as viewed in FIG. 3, of wall 57 and 54 about the hinge causing the top wall 54 to depress the dispenser jet 61 and allowing the mist to escape the dispenser out through an aperture 56 in walls 54 and 57 and into the Receptacle-Separator. A guide wall 58 attached to wall 57 is oriented to direct the mist in the desired direction. Once the drawer is in the completely open position, roller 59 is apart from wall 57 allowing walls 57 and 54 to pivot in a clockwise about the hinge and allowing the top wall 54 to move sufficiently upwardly from dispenser jet 61 which in turns moves upwardly shutting off the flow of mist from the dispenser can. As the drawer is shut, the roller will contact wall 57 causing the jet to be depressed until the drawer is completely closed whereat the roller is beneath and no longer contacts wall 57 allowing the dispenser jet to move upwardly shutting off the flow mist. Dispenser 51 and holder is mounted to the bottom wall 60 of the Receptacle-Separator.

Many variations are contemplated by the present invention. For example, the dispenser emission may be of solid, liquid, atomizer or aerosol states and actuated by mechanical means or timers.

The present invention seeks to reduce the typical "throw away mentality" for valuable materials within the waste products existing today.

The reduction of dependence upon landfills with their ground water leakage, the reduction of air pollution from burning these wastes and the reduction of the costs of importing materials from abroad to produce the products of civilization are societal goods of the Waste Separator and the invention will also produce the societal goods of reducing litter, saving more landfills from being built in one's own neighborhood, and preventing other more expensive disposal techniques for trash. The Waste-Separator's production would provide new employment and generate revenues from the recycling of wastes. Also the product will help reduce the thread of chemicals in one's atmosphere from air and water pollution which can cause infertility in all living things.

It is evident from the above description that the subject invention may be quickly and easily installed at various locales. Further, the invention seeks to reach the philosophical, scientific and religious conscience of the citizens of the industrialized world. In addition, the invention provides for conservation of natural resources for eventual reuse. It is envisioned that the use of this invention will facilitate a whole new philosophy and effect for recycling "in the home or office or church" thereby creating a new lifestyle for the industrialized world.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A waste separator-receptacle for recycling of materials comprising:

a frame having at least four internal waste receiving cavities each opening outwardly thereof;

first closure means on said frame at least partially enclosing one of said cavities;

second closure means on said frame at least partially enclosing one of said cavities;

third closure means on said frame at least partially enclosing one of said cavities;

fourth closure means on said frame at least partially enclosing one of said cavities;

four separate disposable means removably mountable each within a separate cavity and being visually distinguishable apart to separately hold paper, metal, glass and miscellaneous waste products and being operable to individually hold said waste products within said cavities for eventual removal and discarding;

basket means on said frame and associated with each of said closure means to removably hold said separate disposable means;

coordinating means associated with said disposable means and said first closure means, said second closure means, said third closure means and said fourth closure means operable to predetermine the particular waste product to be inserted into a cavity associated with a particular closure means and disposable means; and fluid dispensing means mounted with said frame operable to dispense a fluid therein; and, holding means mounted to said frame to hold said fluid dispensing means and including a hingedly mounted member extending atop said fluid dispensing means and adjacent said basket means and operable when said hingedly mounted member is contacted by said basket means upon opening and closing of one of said closure means to pivot against said fluid dispensing means for the controlled release of said fluid.

2. The waste separator-receptacle of claim 1 wherein:

said basket means includes a plurality of walls joined together forming a plurality of baskets each mounted to a separate one of said closure means with each basket including roller means provided thereon contactable with said member as each closure means with associated basket opens and closes.

3. The waste separator-receptacle of claim 2 wherein:

said fluid dispensing means includes a plurality of pressurized aerosol containers each with depressible jet to control escape of fluid.

4. The waste separator-receptacle of claim 3 wherein:

said baskets each include a bottom wall with a inwardly radiused corner edge with said frame including a plurality of ridges positioned each within said corner edge of said baskets allowing said baskets to pivot thereon.

5. A waste separator-receptacle for recycling of materials and including an environmental control dispenser with holder comprising:

a main frame including a front wall and top wall joined together with said front wall including four openings and said top wall including a fifth opening;

four separate baskets pivotally mounted to said front wall at said four openings and movable back and forth from a first position whereat said openings are closed to a second position whereat said openings are open;

a top cover mounted to said top wall over said fifth opening;

a plurality of disposable receptacles fitable within said baskets and beneath said top cover to receive waste;

a plurality of pressurized containers mounted within said frame and including pressurized liquid therein to dispense, said containers having release means positioned adjacent said baskets being contacted as said baskets move back and forth between said first position and said second position with said release means being operable to release said liquid from said containers when contacted; and, a plurality of holders mounted within said frame and including pivotally mounted walls extending over said release means and against said baskets, said pivotally mounted walls positioned to contact and depress said release means as said baskets are moved contacting said pivotally mounted walls.

6. The waste separator-receptacle of claim 5 and further comprising:

coordinating means associated with said receptacles and said baskets to predetermine the particular waste product to be inserted into a basket associated with a particular basket and disposable means.

7. The waste separator-receptacle of claim 6 wherein:

said coordinating means includes an indicator of a specific color on a particular basket with the same color on the receptacle located within the same basket.

* * * * *